(12) United States Patent
Ritter et al.

(10) Patent No.: US 6,928,269 B2
(45) Date of Patent: Aug. 9, 2005

(54) TRANSMISSION AND RECEPTION DEVICE FOR MOBILE RADIO

(75) Inventors: Kai-Uwe Ritter, Bavaria (DE); Michael Doubrava, Nuremberg (DE)

(73) Assignee: Lucent Technologies Inc., Murray Hill, NJ (US)

( * ) Notice: Subject to any disclaimer, the term of this patent is extended or adjusted under 35 U.S.C. 154(b) by 893 days.

(21) Appl. No.: 09/918,947

(22) Filed: Jul. 31, 2001

(65) Prior Publication Data

US 2002/0022457 A1 Feb. 21, 2002

(30) Foreign Application Priority Data

Aug. 21, 2000 (EP) ............................................. 00307166

(51) Int. Cl.$^7$ ................................................ H04B 1/44
(52) U.S. Cl. ........................... 455/78; 455/73; 455/561; 455/449; 455/463; 455/522; 455/562.1; 455/552.1; 455/553.1
(58) Field of Search .......................... 455/73, 561, 449, 455/463, 522, 562.1, 552.1, 553.1

(56) References Cited

U.S. PATENT DOCUMENTS 6,317,610 B1 * 11/2001 Jantti .......................... 455/561
6,411,825 B1 * 6/2002 Csapo et al. ................. 455/561

FOREIGN PATENT DOCUMENTS

| EP | 0 692 918 A2 | 7/1995 | ............ H04Q/7/22 |
|---|---|---|---|
| WO | PCT/SE97/00497 | 3/1997 | ............ H04B/1/02 |
| WO | PCT/US98/06891 | 4/1998 | ............ H04B/1/30 |

* cited by examiner

Primary Examiner—Harry S. Hong
Assistant Examiner—Marie C. Ubiles

(57) ABSTRACT

Transmission and reception device for a mobile radio base station comprising a plurality of transmission and reception units and hence a plurality of carriers, the transmission and reception units being accommodated in push-in modules and each having a modulator (10), a channel frequency device (19) and an output stage (20). At least some of the push-in modules comprise two full transmission and reception units having a first and a second transmission branch (1, 2). The two transmission branches (1, 2) are connected to a transmission connection (4) via an incorporated hybrid combiner (3) in order to provide two mutually combined carriers in a first mode of operation for relatively high capacity. In a second mode of operation for high output power, the two transmission branches (1, 2) are additionally connected to one another by means of an internal changeover device (25, 26, 27) such that the same transmitted signal is routed at least via the output stages (20) of both transmission branches (1, 2).

7 Claims, 2 Drawing Sheets

TRANSMISSION AND RECEPTION DEVICE FOR MOBILE RADIO

CROSS-REFERENCE TO RELATED APPLICATION

This application claims priority of European Patent Application No.00307166.9, which was filed on Aug. 21, 2000.

BACKGROUND OF THE INVENTION

1. Field of the Invention

The invention relates to a transmission and reception device for a mobile radio base station comprising a plurality of transmission and reception units and hence a plurality of carriers, the transmission and reception units being accommodated in push-in modules and each having a modulator, a channel frequency device and an output stage.

2. Description of Related Art

A mobile radio base station usually serves a plurality of radio cells arranged sectorally with respect to the base station. Normally, three radio cells are provided per base station. Each radio cell has a plurality of associated transmission and reception devices, for example four such units. The possibility of diversity reception means that one radio cell normally has two antennas which are also used for transmission. In the example quoted, two transmission and reception units operate on one antenna. To enable this, so-called hybrid combiners are in use. When the carriers are combined, losses of 3 dB occur, which amounts to half the consumed power. A normal transmitter output power is 40 W per transmission and reception unit. The losses are accordingly considerable and are converted to heat in a load resistor. The hybrid combiners themselves are accommodated in particular individual push-in units. Each antenna additionally requires a duplex filter in order to separate the transmission and reception frequencies from one another.

In the example quoted, there are thus twelve transmission and reception units at the base station, which are accommodated in a so-called cabinet which is fully utilized.

In practice, the growing interest in mobile radio has resulted in a further increase in the number of carriers per cell. This can be achieved by means of a second fully stocked cabinet next to the first cabinet, so that the number of carriers is increased to twenty-four in the example given. For service providers, this solution has the disadvantage that their rental costs are increased.

When a mobile network is set up, there are initially few cells and a small number of carriers, and it is therefore necessary to operate at high transmitter output power in order to cover the relatively large cells. If the number of subscribers increases, then both the number of radio cells and the number of carriers per radio cell are increased. These radio cells are smaller and can be served at a lower transmitter output power.

SUMMARY OF THE INVENTION

The invention is based on the object of designing a transmission and reception device of the type mentioned in the introduction such that operation can be matched to an increasing number of mobile radio subscribers. In addition, the aim is to lower the outlay for installation and operation of the transmission and reception device.

The object which is set is achieved on the basis of the features of the main claim and is refined and developed further by the further features of the dependent claims.

The following advantages can be achieved with the invention's design of the transmission and reception device: the mobile radio network can be developed in stages. At the start of network development, a high output power is available, while, as the number of subscribers increases, a two-carrier mode can be used to change over to a higher capacity.

To adapt to particular radio conditions, it is also possible to change over between a high-power mode and a high-capacity mode during continuous operation. In this case, use is made of the circumstance that the transmitters connected to one another by means of the hybrid combiner are operated in time slots which are synchronized with one another. The changeover from high power to high capacity is carried out on the basis of time slots.

If the hybrid combiner is also incorporated in the push-in module in addition to the first and second transmission and reception units, less outlay is required for the cables, and two radio frequency cables per transmission and reception unit are dispensed with. This elimination also results in the power loss being reduced. Further cost reductions result from the elimination of the otherwise necessary extra housing for the hybrid combiner. The solution according to the invention also enables the costs of isolation in the output stage to be reduced.

BRIEF DESCRIPTION OF THE DRAWINGS

The invention is described with the aid of the drawing, in which.

DETAILED DESCRIPTION

Figure 1:
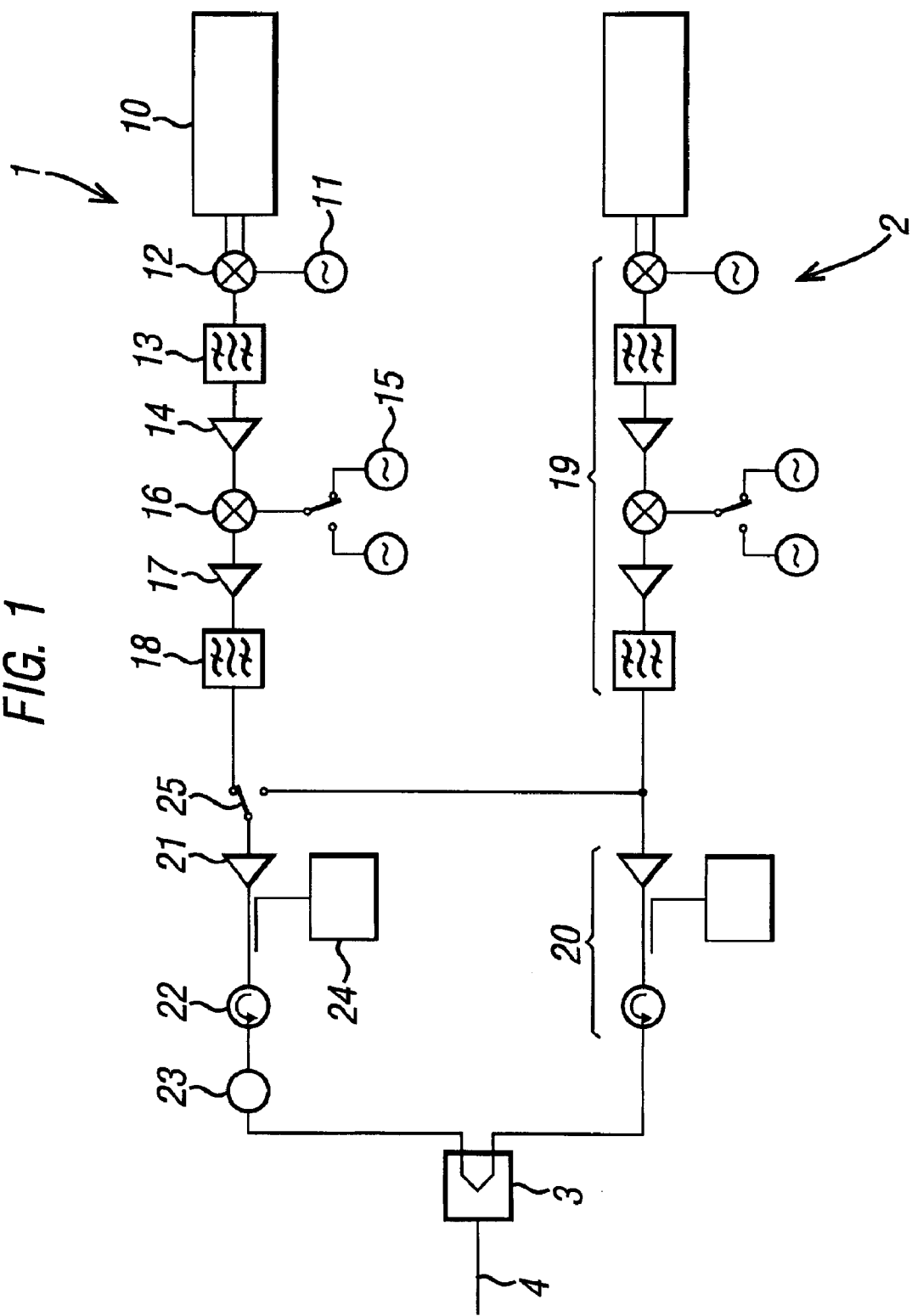
FIG. 1 shows a first embodiment of the transmission part of the transmission and reception unit.

The block circuit shown in FIG. 1 comprises a transmission branch 1, a transmission branch 2 and a hybrid combiner 3 with a transmitter output 4. Each transmission branch 1, 2 comprises a modulator 10 and a first oscillator 11 which are connected to a mixer 12 and to a first bandpass filter 13 in order to supply a modulated frequency signal to an amplifier 14. Second oscillators 15 are in the form of toggle synthesizers and are connected to a second mixer 16, to which the output of the amplifier 14 is also connected. The power of the resultant frequency signal is regulated in a power amplifier 17 and is supplied to a second bandpass filter 18. Parts 11 to 18 form a channel frequency device 19. This is adjoined by an output stage 20 which contains a power amplifier 21, an isolator 22 and possibly a phase shifter 23. In addition, the output stage 20 has an associated power detector 24. The two transmission branches 1 and 2 are also connected to one another via a combination switch 25 which enables the output of the channel frequency device 19 in the second transmission branch 2 to be connected to the input of the output stage 20 in the first transmission branch 1.

The dual transmission and reception unit shown has only one transmission connection 4, which is located on the hybrid combiner 3. The transmission branches 1 and 2 are operated such that 2×20 W are available in combination at the transmission connection 4. It should be noted that combination losses arise at the same level.

To achieve in-phase operation for the two output stages 20, the signal transit times of the two output stages and of the isolators need either to be matched very precisely or to be tuned.

The hybrid combiner 3 is used to add the two signals from the transmission branches 1 and 2 and to output them at the transmission connection 4. If the hybrid combiner 3 used is a so-called branch arm coupler comprising stripline structures, an additional lambda/4 line is used as the phase shifting device 23 in order to bring about a 90° phase shift in one of the branches 1 or 2 (shown in branch 1 in this case). The branch arm coupler then provides in-phase addition of the signals from the two transmission branches 1 and 2.

The phase shifting device 23 need not be arranged directly at the input of the hybrid combiner 3; it may also be arranged directly upstream of the power amplifier 21. Such an arrangement has the advantage that the signal power upstream of the power amplifier 21 is low, and hence the power loss is also still low.

If the combination switch 25 in FIG. 1 is thrown, then the channel frequency device 19 in the transmission branch 2 operates on the output stages 20 of both transmission branches 1 and 2, i.e. the two transmitter output stages 20 are operated at the same frequency and using the same data. In such a case, the hybrid combiner 3 can be driven such that the losses of 3 dB which arise otherwise do not arise when the carriers are combined, i.e. the two input signals, coming from the transmission branches, at the combiner are added if the phases coincide. If the two transmission branches are each designed for 40 watts, then 80 watts are available at the transmitter output 4. The invention is therefore particularly suitable for the initial structure of the mobile radio network, where the individual radio cells still have a large surface area.

Figure 2:
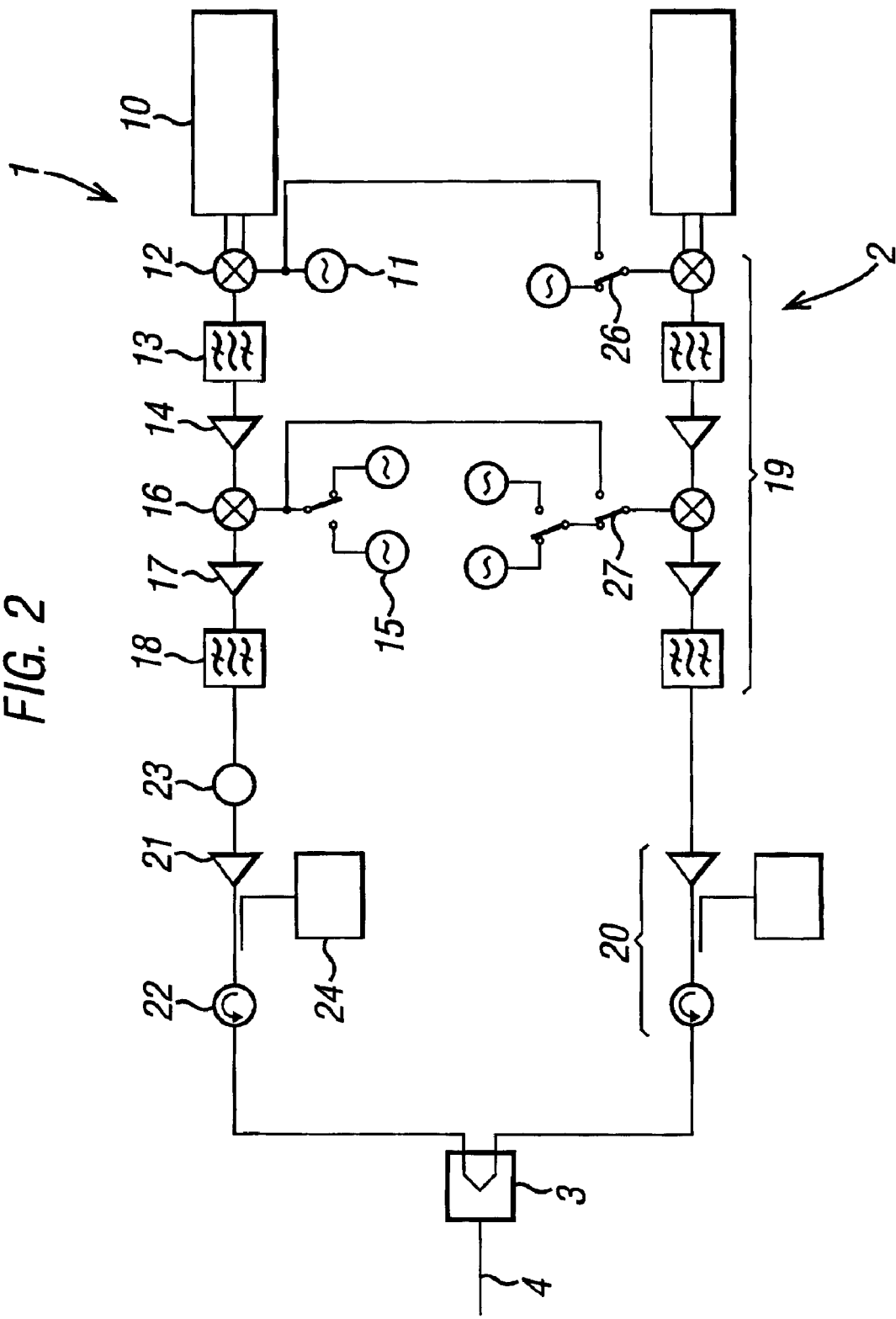
FIG. 2 shows a second embodiment of the transmission part of the transmission and reception unit.

FIG. 2 shows a further illustrative embodiment of the invention in the form of a block diagram. Where there is correspondence with the first illustrative embodiment, the same reference numerals are used and reference is made to the pertaining description. The operation using combined carriers at the output 4 is the same as in the first illustrative embodiment. The embodiment shown in FIG. 2 likewise allows a high output power to be output at the transmitter output 4. In this regard, the transmission branches 1 and 2 are operated using the same data, frequencies and phases. The following measures are taken in this regard:

The modulators used are, by way of example, DSP (Digital Signal Processor) devices with downstream D/A converters, so that the two branches can be operated using the same data. The frequency and phase coincidence of the two transmission branches 1 and 2 is produced by using the oscillators of only one branch, in this case the transmission branch 1. A first changeover switch 26 is provided in order to apply the signal from the oscillator 11 in the transmission branch 1 to the mixer 12 in the transmission branch 2, and a further changeover switch 27 is provided in order to connect the oscillator 15 in the transmission branch 1 to the mixer 16 in the transmission branch 2. If small phase shifts arise, this can be compensated for at the modulators 10. Amplitude differences can be compensated for by tuning the modulators or by making appropriate adjustments on the amplifiers 17. The losses in the hybrid combiner 3 and in the isolators 20 and possibly the phase shifting unit 23 have been determined previously; the actual output power can therefore be ascertained on the basis of the power measured using the power detectors 24.

We claim:

1. Transmission and reception device for a mobile radio base station comprising a plurality of transmission and reception units and hence a plurality of carriers, the transmission and reception units being accommodated in push-in modules and each having a modulator, a channel frequency device and an output stage, said device comprising:

at least some of the push-in modules comprise two full transmission and reception units having a first and a second transmission branch;

the two transmission branches are connected to a transmission connection via an incorporated hybrid combiner in order to provide two mutually combined carriers in a first mode of operation for relatively high capacity; and in a second mode of operation for high output power, the two transmission branches are additionally connected to one another by means of an internal changeover device such that the same transmitted signal is routed at least via the output stages of both transmission branches.

2. Transmission and reception device according to claim 1, wherein the internal changeover device comprises a combination switch which connects the output of the channel frequency device in one transmission branch to both output stages.

3. Transmission and reception device according to claim 2, wherein the same transit time delay can be set for both output stages.

4. Transmission and reception device according to claim 1 wherein the hybrid combiner is in the form of a branch arm coupler and in that a 90° phase shifting device is provided in the course of the output stage of one transmission branch.

5. Transmission and reception device according to claim 4 wherein the 90° phase shifting device is connected directly upstream of the hybrid combiner.

6. Transmission and reception device according to claim 4 wherein the 90° phase shifting device is connected directly upstream of the amplifier in the output stage.

7. Transmission and reception device according to claim 1 wherein the internal changeover devices cover the connection of frequency-generating elements in one branch to mixers in the other branch.

* * * * *